(12) United States Patent
Hinderliter

(10) Patent No.: US 11,863,051 B2
(45) Date of Patent: Jan. 2, 2024

(54) THERMAL MANAGEMENT SYSTEM

(71) Applicant: General Electric Company, Schenectady, NY (US)

(72) Inventor: Kevin Edward Hinderliter, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 293 days.

(21) Appl. No.: 17/319,802

(22) Filed: May 13, 2021

(65) Prior Publication Data
US 2022/0368197 A1 Nov. 17, 2022

(51) Int. Cl.
| | |
|---|---|
| *H02K 9/19* | (2006.01) |
| *F01P 5/10* | (2006.01) |
| *B64D 33/08* | (2006.01) |
| *F01P 11/10* | (2006.01) |
| *F01P 3/18* | (2006.01) |

(52) U.S. Cl.
CPC ............... *H02K 9/19* (2013.01); *F01P 5/10* (2013.01); *F01P 11/10* (2013.01); *B64D 33/08* (2013.01); *F01P 2003/182* (2013.01)

(58) Field of Classification Search
CPC . H02K 9/19; H02K 9/197; F01P 11/10; F01P 2003/182; F01P 5/10; F01P 2005/103; B64D 33/08
See application file for complete search history.

(56) References Cited

U.S. PATENT DOCUMENTS

| | | | |
|---|---|---|---|
| 3,189,769 A | 6/1965 | Willyoung | |
| 5,884,498 A | 3/1999 | Kishimoto et al. | |
| 7,064,463 B2 | 6/2006 | Matin et al. | |
| 7,334,543 B2 | 2/2008 | Pawellek | |
| 8,604,651 B2 | 12/2013 | Himmelmann | |
| 8,653,703 B2 | 2/2014 | Kori et al. | |
| 9,000,632 B2 | 4/2015 | Matsuki et al. | |
| 9,006,942 B2 | 4/2015 | Lemmers, Jr. et al. | |
| 9,518,477 B2 | 12/2016 | Karlsson et al. | |
| 9,580,159 B1 | 2/2017 | Provost | |
| 9,689,281 B2 | 6/2017 | Cogswell et al. | |
| 11,031,848 B2 | 6/2021 | Heiden et al. | |
| 2004/0261428 A1 | 12/2004 | Murry et al. | |
| 2013/0195695 A1* | 8/2013 | Van Dam | F03G 7/04 310/54 |
| 2015/0207387 A1 | 7/2015 | Kudose | |
| 2016/0252089 A1 | 9/2016 | Hansen | |
| 2017/0175612 A1* | 6/2017 | Tokozakura | F01P 7/14 |

OTHER PUBLICATIONS

NIKKISO Non-Seal Centrifugal Canned Motor Pump, LEWA Creating Fluid Solutions, 21 Pages. http://www.lewa-inc.com/en/pumps/centrifugal-pumps/nikkiso-centrifugal-canned-motor-pump/.

* cited by examiner

*Primary Examiner* — Jacob M Amick
(74) *Attorney, Agent, or Firm* — Dority & Manning, P.A.

(57) ABSTRACT

A thermal management system including a fluid flow mechanism. The fluid flow mechanism includes an electric machine. A conduit is formed through the electric machine allowing a heat transfer fluid to flow therethrough. The fluid flow mechanism includes a flow device configured to provide a first portion of the heat transfer fluid to a first heat exchange circuit and a second portion of heat transfer fluid to a second heat exchange circuit. The conduit is in fluid communication with the second heat exchange circuit.

18 Claims, 5 Drawing Sheets

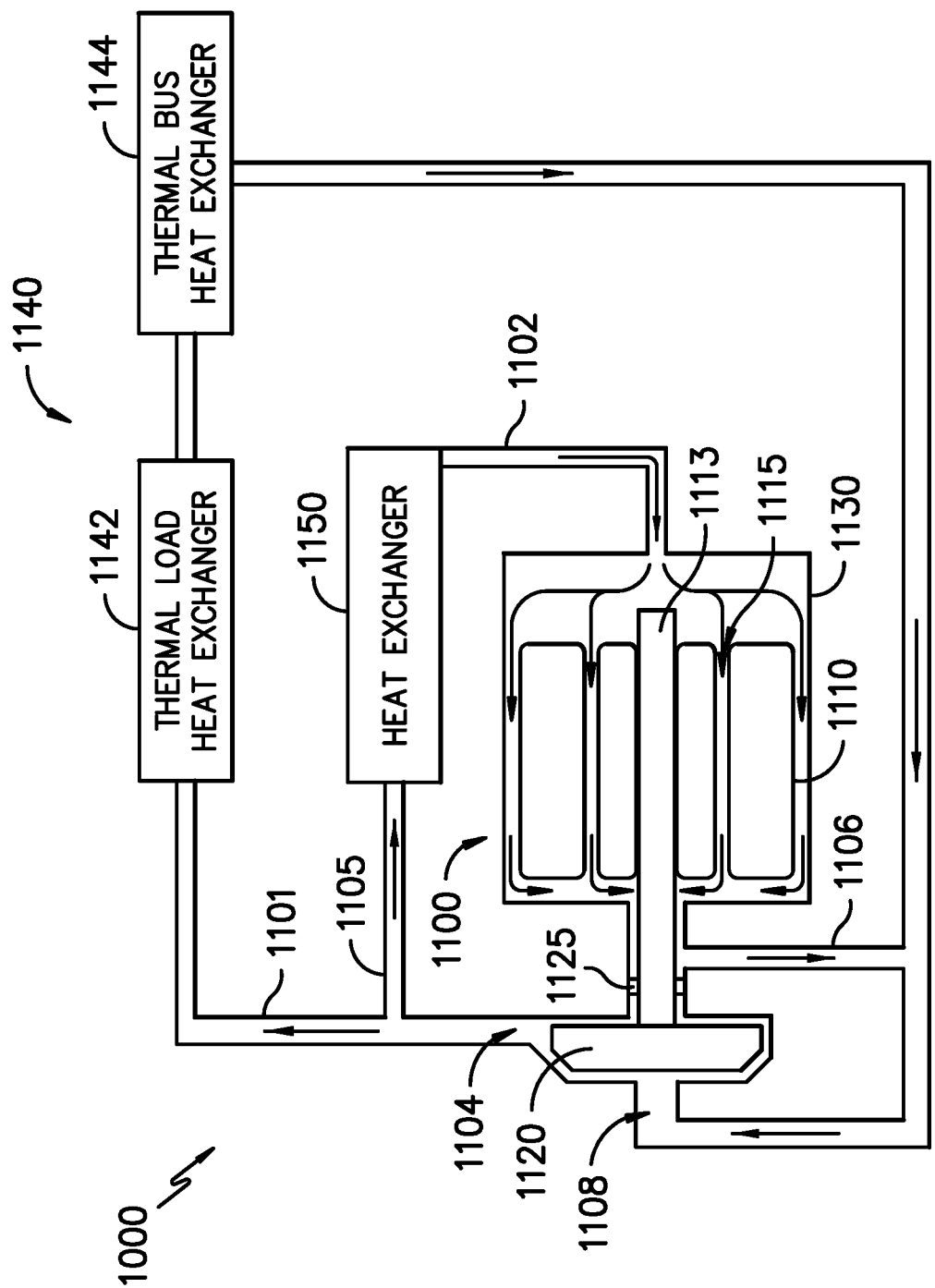
FIG. -1-

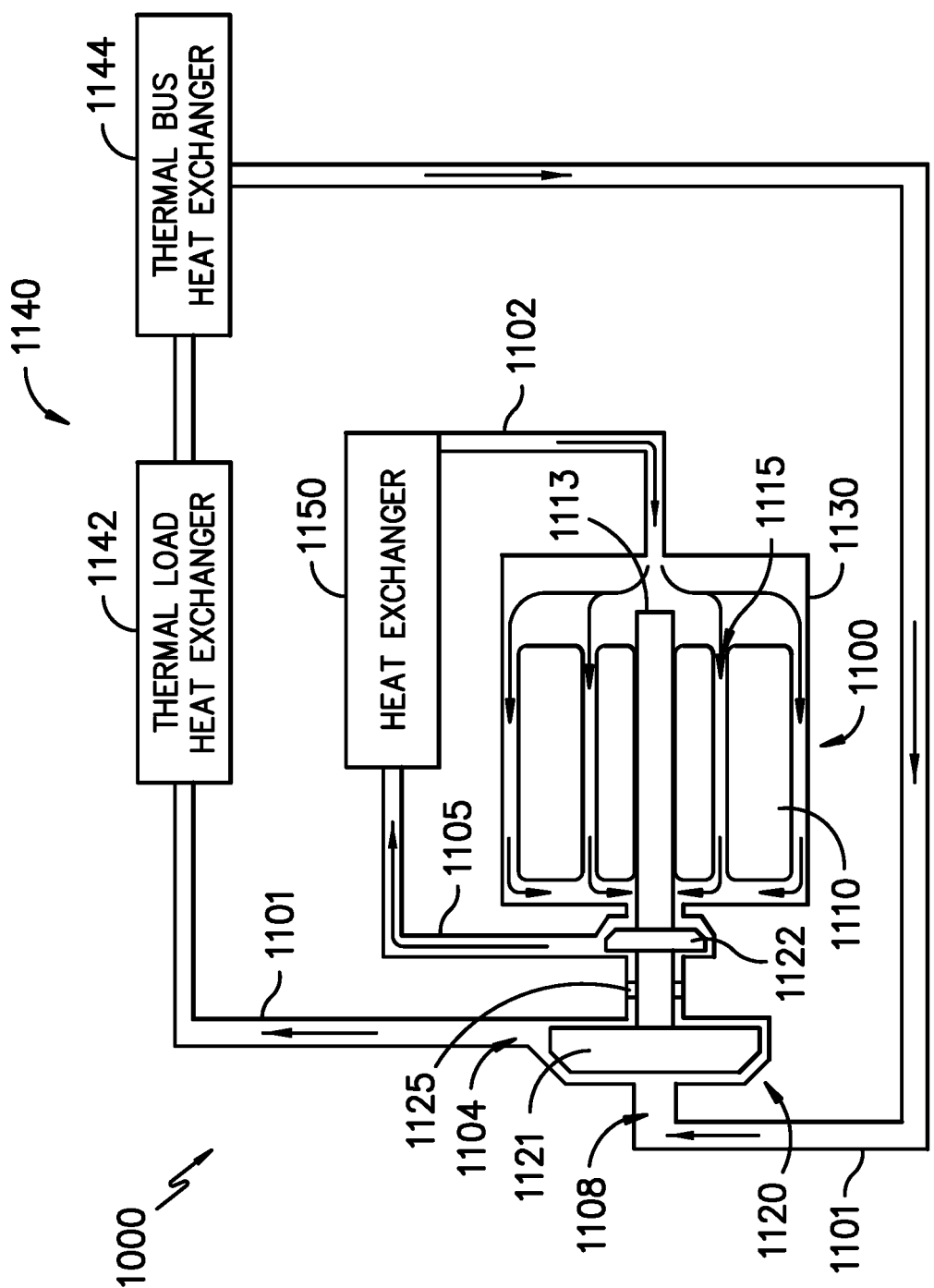
FIG. -2-

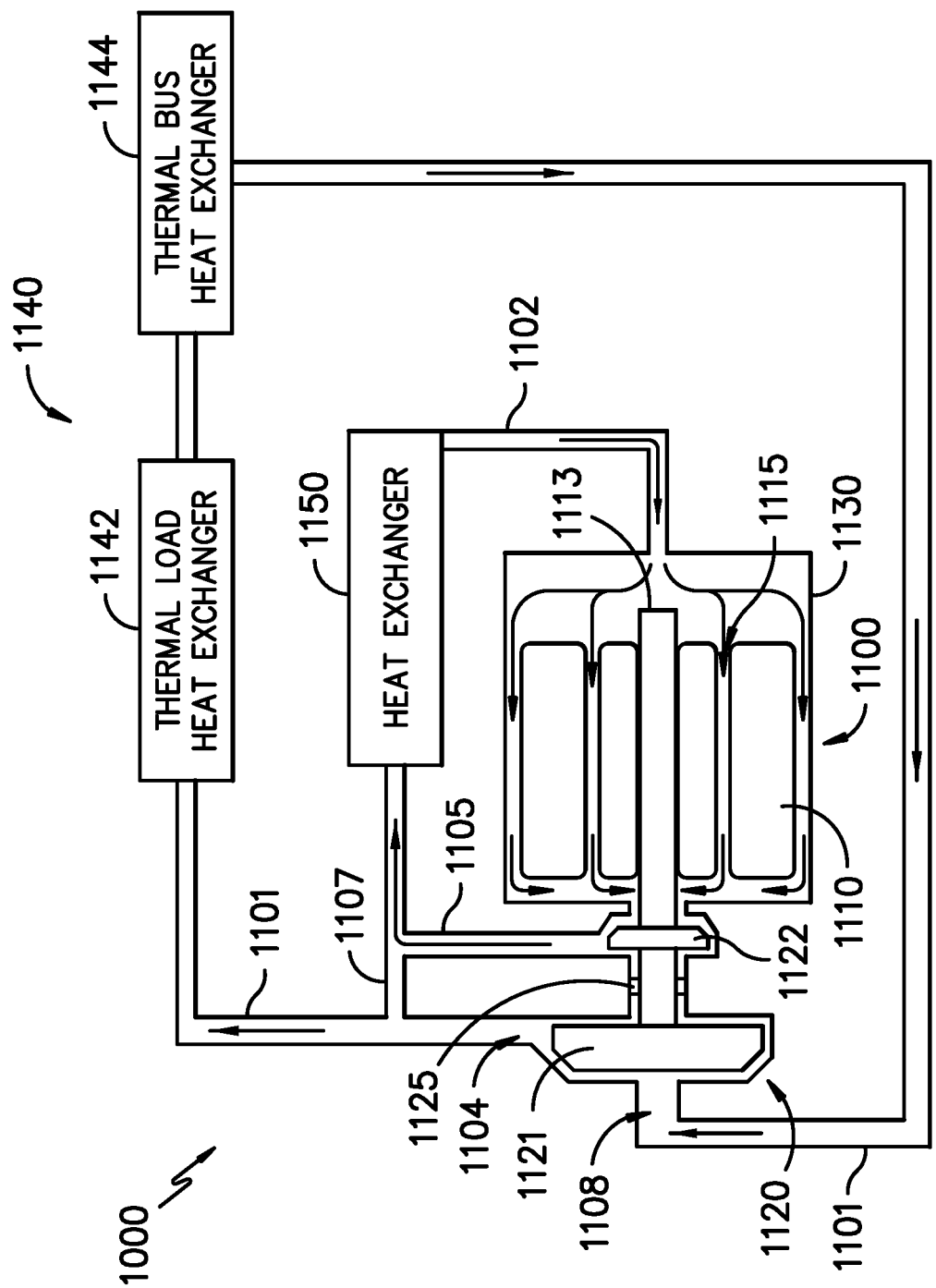
FIG. -3-

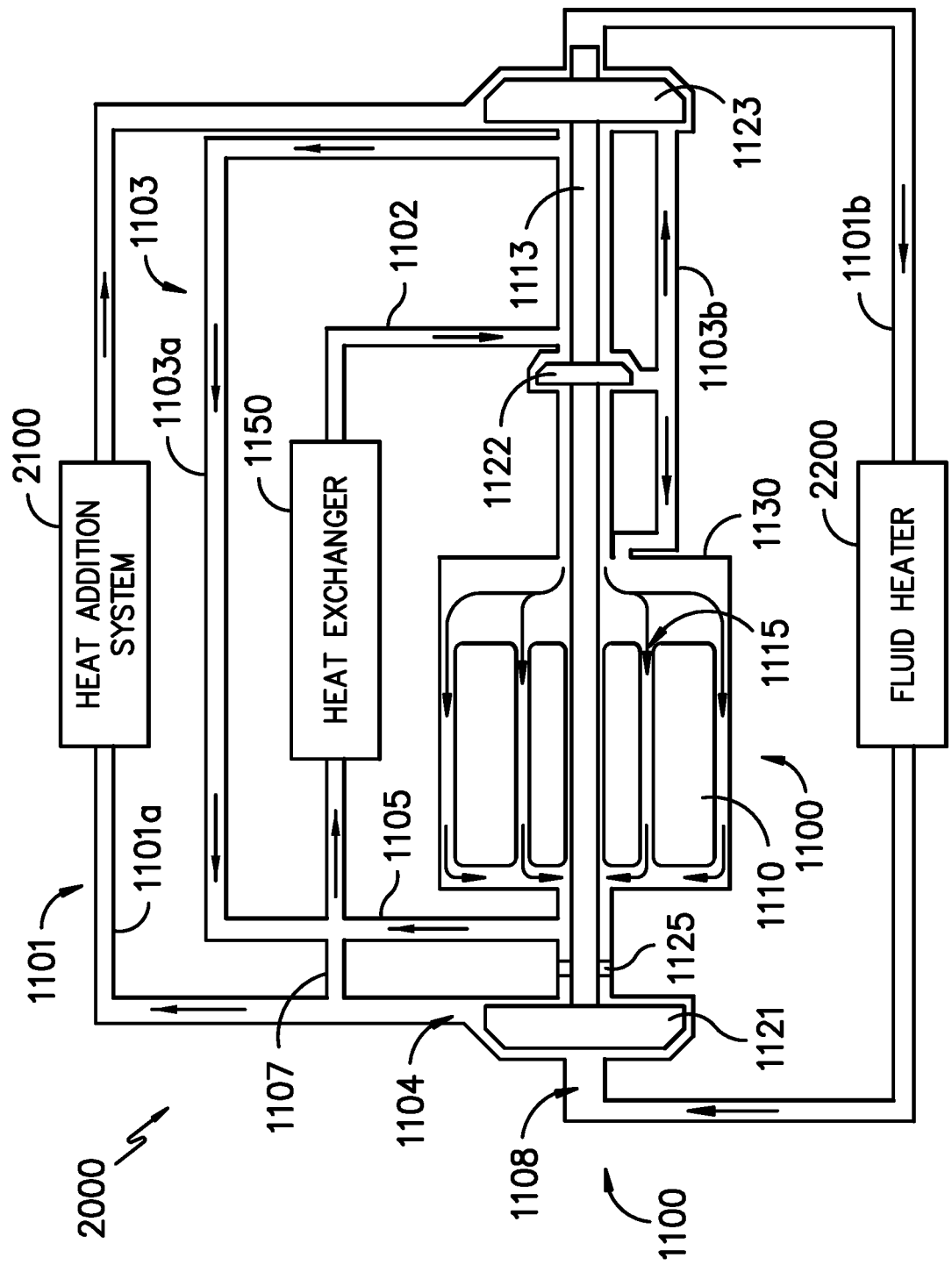
FIG. -4-

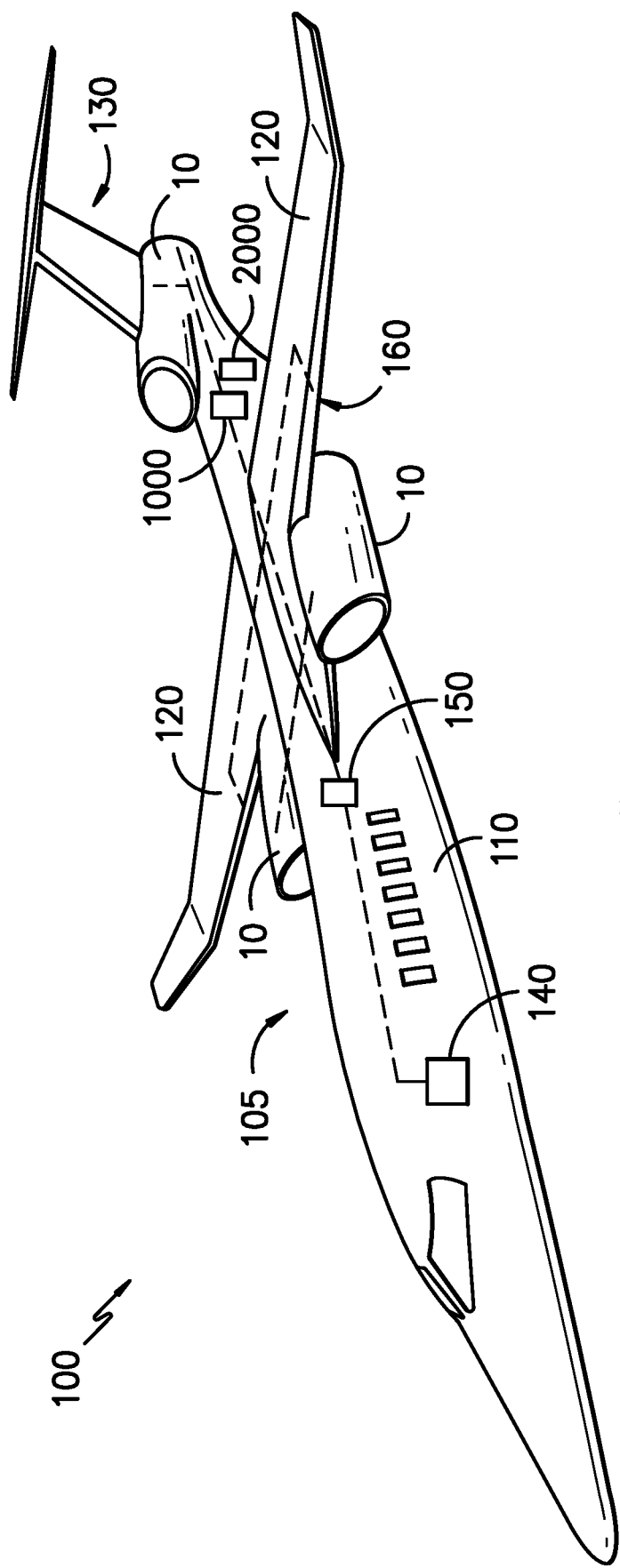
FIG. -5-

THERMAL MANAGEMENT SYSTEM

FIELD

The present subject matter relates generally to heat exchange systems, thermal transport buses, and thermal attenuation structures.

BACKGROUND

Thermal transport buses and heat exchange systems generally rely on high temperature motors and insulation systems for effective cooling of components of thermal management systems. However, such systems may leak or otherwise undesirably allow lubricants, fuels, or other fluids into the heat transfer fluid. Shaft seals, magnetic couplings, and high-temperature motor designs generate risks associated with leakages, including motor deterioration and loss of thermal efficiency. As such, there is a need for systems that mitigate or eliminate risks associated with shaft seals, magnetic couplings, and high-temperature motor design.

BRIEF DESCRIPTION

Aspects and advantages of the invention will be set forth in part in the following description, or may be obvious from the description, or may be learned through practice of the invention.

A thermal management system including a fluid flow mechanism. The fluid flow mechanism includes an electric machine. A conduit is formed through the electric machine allowing a heat transfer fluid to flow therethrough. The fluid flow mechanism includes a flow device configured to provide a first portion of the heat transfer fluid to a first heat exchange circuit and a second portion of heat transfer fluid to a second heat exchange circuit. The conduit is in fluid communication with the second heat exchange circuit.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIGS. 1-3 are schematic embodiments of a thermal management system in accordance with aspects of the present disclosure;

FIG. 4 is a schematic embodiment of an energy conversion system including an embodiment of the thermal management system in accordance with aspects of the present disclosure; and FIG. 5 is a perspective view of an exemplary vehicle including the thermal management system in accordance with aspects of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Embodiments of a thermal management system are provided herein that may mitigate or eliminate risks associated with shaft seals, magnetic couplings, and high-temperature motor and/or generator design. The thermal management system may include a thermal transport bus (TTB) having a first heat exchanger along a first heat exchanger circuit utilizing the same heat transfer working fluid for cooling an electric machine through a temperature-controlled bleed circuit at a second heat exchange circuit. Embodiments provided allow for a single, closed-loop and hermetically-sealed system for the TTB. Such embodiments further allow for mitigating or eliminating risks associated with contamination of the TTB with lubricant, electric machine coolant, or other undesired fluids.

Embodiments of the thermal management system include a dedicated secondary circuit, such as a second heat exchange circuit described below, thermally isolated from a primary TTB circuit along a first heat exchange circuit, and configured to maintain or control the temperature of heat transfer fluid through an electric machine, a pump, a compressor, or a fluid flow device generally. The thermally isolated secondary circuit shares the same fluid and pressure as the primary TTB circuit, such as through a seal configured to allow for desired fluid communication therethrough, or through an open charging circuit. The temperature and mass flow rate of the fluid through the thermally isolated secondary circuit allows for desired cooling, thermal attenuation, or heat transfer for the electric machine substantially independent of the primary TTB flow.

Referring now to the drawings, FIGS. 1-4 provide schematic embodiments of a thermal management system 1000. The system 1000 includes a pump, compressor, or other fluid flow mechanism 1100. The fluid flow mechanism 1100 has an electric machine 1110 configured to drive a flow device 1120. In certain embodiments, a driveshaft 1113 operably couples the flow device 1120 to the electric machine 1110 to drive the flow device 1120 to generate a desired flow of heat transfer fluid through a first heat exchange circuit 1101 and a second heat exchange circuit 1102. A conduit 1115 is extended through the fluid flow mechanism 1100 to allow for a heat transfer fluid to flow therethrough in thermal communication. A housing 1130 surrounds the fluid flow mechanism 1100. In a particular embodiment, the conduit 1115 is extended through one or more pathways extended through the electric machine 1110 to provide thermal communication between the heat transfer fluid and components of the electric machine 1110 (e.g., rotors, stators, casings, etc.). In a still particular embodiment, the conduit 1115 is extended through the housing 1130 or between the housing 11130 and the electric machine 1110. In various embodiments, the housing 1130, the first heat exchange circuit 1101, and the second heat exchange circuit 1102 are hermetically sealed to contain the heat transfer fluid therewithin. Various embodiments of the flow device 1120 include an impeller having blades within the housing 1130 configured to generate a pressurized flow of the heat transfer fluid through the heat exchange circuits 1101, 1102.

The first heat exchange circuit 1101 and the second heat exchange circuit 1102 are substantially thermally isolated from one another. Thermal isolation includes each heat exchange circuit 1101, 1102 configured to contain and flow the heat transfer fluid through the respective circuits. Changes in thermal load or temperature of the heat transfer fluid at the first heat exchange circuit 1101 in thermal communication with a first heat exchanger 1140 is substantially separate or isolated from changes in thermal load or temperature of the heat transfer fluid at the second heat exchange circuit 1102 in thermal communication with the fluid flow mechanism 1100 and the second heat exchanger 1150. In various embodiments, the first heat exchange circuit 1101 is in substantially parallel flow arrangement with the second heat exchange circuit 1102. The second heat exchange circuit 1102 is in fluid communication with the conduit 1115 through the fluid flow mechanism 1100.

In certain embodiments, the first heat exchange circuit 1101 is configured as a primary thermal transport bus (TTB). The primary TTB is a device for transporting thermal energy from a physical location or system to another physical location or system using a thermal transport fluid flowing through a conduit extending between these physical locations and/or systems. In particular embodiments, the system 1000 is in closed-loop flow arrangement from an inlet 1108 of the flow device 1120 to an outlet 1104 of the flow device 1120.

In the embodiment shown, the first heat exchange circuit 1101 is configured in thermal communication with one or more first heat exchangers 1140. More specifically, for the exemplary embodiment shown, the one or more first heat exchangers 1140 includes a plurality of first heat exchangers 1140. More specifically, still, for the embodiment shown, the plurality of first heat exchangers 1140 includes one or more thermal load heat exchangers 1142 and one or more thermal bus heat exchangers 1144. In such a manner, it will be appreciated that the one or more first heat exchangers 1140, and in particular for the embodiment shown, the one or more thermal load heat exchangers 1142 and thermal bus heat exchangers 1144, are configured to receive or provide heat or thermal energy to the heat transfer fluid through the first heat exchange circuit 1101.

More specifically, in one embodiment, the one or more thermal load heat exchangers 1142 are configured to reject heat or thermal energy from the heat transfer fluid through the first heat exchange circuit 1101, and the one or more thermal bus heat exchangers 1144 are configured to provide heat or thermal energy to the heat transfer fluid through the first heat exchange circuit 1101. In a particular embodiment, the thermal load heat exchangers 1142 are positioned upstream of the thermal bus heat exchangers 1144 along the first heat exchange circuit 1101. However, it should be appreciated that in other embodiments the thermal load heat exchangers 1142 and the thermal bus heat exchangers 1144 may be positioned in any desired or operable configuration based on desired heat retention or heat release thereto. Furthermore, various embodiments may include any desired quantity of thermal bus heat exchangers 1142 or thermal load heat exchangers 1144 as may be applicable to removing or providing thermal energy in accordance with aspects of the present disclosure.

In still certain embodiments, the second heat exchange circuit 1102 is configured as a secondary TTB configured in thermal communication with one or more of a second heat exchanger 1150. In various embodiments, the second heat exchanger 1150 is configured to receive heat or thermal energy from the heat transfer fluid through the second heat exchange circuit 1102. In a particular embodiment, the second heat exchanger 1150 is an electric machine-cooler heat exchanger configured to remove heat or thermal energy from the heat transfer fluid through the second heat exchange circuit, such as to provide cooling or thermal attenuation to the fluid flow mechanism 1100, or particularly the electric machine 1110 through which the one or more conduits 1115 is extended in thermal communication thereto. In still particular embodiments, such as depicted in FIG. 2, the second heat exchange circuit 1102 is in closed-loop flow arrangement with the conduit 1115 through the fluid flow mechanism 1100.

During operation of the system 1000, the flow device 1120 is configured to receive and induce, pressurize, or compress the flow of heat transfer fluid across the flow device 1120 from the suction side or inlet 1108 to the pressure side or outlet 1104. The thermal bus heat exchangers 1144 may extract or receive heat or thermal energy from the heat transfer fluid. The thermal load heat exchangers 1142 may then provide heat or thermal energy to the heat transfer fluid as the fluid flows in a loop back to the inlet 1108 of the flow device 1120. In various embodiments, the thermal bus heat exchanger 1144 at a lubrication system, a fuel system, an air system, a hydraulic system, or combinations thereof. The various systems may be any one or more systems such as may be included with a propulsion system (e.g., propulsion system 10 in FIG. 5), an auxiliary power unit, a hybrid-electric power system, a fan propulsion system, or an aircraft in general (e.g., vehicle 100 in FIG. 5). In still certain embodiments, the thermal bus heat exchanger 1144 receives heat or thermal energy from the heat transfer fluid and transfers the heat or thermal energy to a lubricant, a liquid and/or gaseous fuel, air or oxidizer generally, or a hydraulic fluid. The heat or thermal energy may be expelled, such as with a flow of air into atmospheric condition, or the thermal energy may be utilized to condition a flow of lubricant, fuel, air, or hydraulic fluid to a desired physical property (e.g., temperature, viscosity, or other desired physical property of fluid). Various embodiments of the thermal load heat exchanger 1142 include any one or more systems that may provide or transmit heat or thermal energy to the heat transfer fluid at the system 1000. Exemplary embodiments of the thermal load heat exchanger 1142 are provided further below.

The first heat exchange circuit 1101 forming a primary TTB may be configured to maintain or control the temperature of a first portion of heat transfer fluid in thermal communication with the first heat exchanger 1140 separately from the second heat exchange circuit 1102 forming a thermally isolated circuit sharing the same heat transfer fluid as the first heat exchange circuit 1101. The temperature and mass flow rate of the heat transfer fluid through the second heat exchange circuit 1102 allows for desired cooling or thermal attenuation at the electric machine 1110 substantially independent of the primary TTB flow through the first heat exchange circuit 1101.

Referring now to FIG. 1, in a particular embodiment, a first portion 1105 of the second heat exchange circuit 1102 is extended from upstream of the second heat exchanger 1150 to provide the heat transfer fluid from the fluid flow mechanism 1100 to thermal communication with the second heat exchanger 1150 to remove heat or thermal energy from the heat transfer fluid. In one embodiment, such as depicted in FIG. 1, the first portion 1105 is extended from the outlet 1104 of the flow device 1120. A second portion 1106 of the second heat exchange circuit 1102 is extended from downstream of the conduit 1115, or downstream of the electric machine 1110, to the inlet 1108 of the flow device 1120. A seal 1125 at least partially separates the flow device 1120 from the electric machine 1110, such as to thermally separate the first heat exchange circuit 1101 from the second heat exchange circuit 1102. In such configurations, the second heat exchange circuit 1102 is in an open charging relationship with the first heat exchange circuit 1101. The open charging relationship allows for fluid communication between the first heat exchange circuit 1101 and the second heat exchange circuit 1102. The open charging relationship may allow for the first heat exchange circuit 1101 to form an expansion tank or reservoir for the second heat exchange circuit 1102. Pressure changes at the second heat exchange circuit 1102 may be accommodated by the open charging relationship with the first heat exchange circuit 1101. As such, the open charging relationship may mitigate overpressurization at the system 1000, or undesired changes or fluctuations in pressure of the heat transfer fluid in the system 1000. A single flow device 1120 forming a single stage impeller may provide flow and pressure for the first portion of heat transfer fluid to flow through the first heat exchange circuit 1101 and for the second portion of heat transfer fluid to flow through the second heat exchange circuit 1102.

The seal 1125 may include any appropriate type of filler material between the driveshaft 1113 and the surrounding housing, conduits, circuits, or other walls or surfaces. Exemplary seals include rotary seals, labyrinth seals, shaft sleeves, V-seals, lip seals, or other appropriate seals for rotating-to-static interfaces. The seal 1125 may allow for desired levels of leakage or fluid communication thereacross. However, it should be appreciated that leakages or fluid communication across the seal 1125 may occur while allowing for the first heat exchange circuit 1101 to be substantially thermally isolated, separate, parallel flow from the second heat exchange circuit 1102.

Referring now to FIG. 2, in another exemplary embodiment, the flow device 1120 at the fluid flow mechanism 1100 may include a first flow device 1121 and a second flow device 1122. The first flow device 1121 is configured to provide a first portion of the heat transfer fluid to the first heat exchange circuit 1101. The second flow device 1122 is configured to provide a second portion of the heat transfer fluid to the second heat exchange circuit 1102. In a particular embodiment, the seal 1125 is positioned between the first flow device 1121 and the second flow device 1122, such as to thermally isolate the heat exchange circuits 1101, 1102 from one another. In such configurations, the first flow device 1121 and the second flow device 1122 provide respective flows of the first portion and the second portion of heat transfer fluid through the first heat exchange circuit 1101 and the second heat exchange circuit 1102, respectively.

In a particular embodiment, the first flow device 1121 is configured as a compressor, a pump, or other device to pressurize the flow of fluid. In another exemplary embodiment, the second flow device 1122 is configured as a pump inducer. The second flow device 1122 configured as a pump inducer may act to raise the pressure of the heat transfer fluid.

During operation of the system 1000, the first flow device 1121 flows the heat transfer fluid through the first heat exchange circuit 1101 such as described above. The second flow device 1122 is configured to receive and pressurize the flow of heat transfer fluid across the second flow device 1122 from a suction side proximate to the electric machine 1110 to the first portion 1105 of the second heat exchange circuit 1102. The second heat exchanger 1150, such as an electric machine-cooler heat exchanger, may extract or receive heat or thermal energy from the heat transfer fluid. The cooled heat transfer fluid then flows in a loop through the conduit 1115 and to the suction side of the second flow device 1122.

Referring now to the exemplary embodiment of FIG. 3, the embodiment provided combines the flow devices 1121, 1122 such as is provided in FIG. 2 with an open charging relationship provided in FIG. 1. In FIG. 3, a charging port 1107 fluidly connects the first heat exchange circuit 1101 upstream of the first heat exchanger 1140 and downstream of the first flow device 1121 to the first portion 1105 of the second heat exchange circuit 1102 upstream of the second heat exchanger 1150. The charging port 1107 allows the flow of heat transfer fluid to be re-charged at the second heat exchange circuit 1102. Additionally, or alternatively, the charging port 1107 sets a reference pressure for the second heat exchanger circuit 1102.

Referring now to FIG. 4, a schematic embodiment of an energy conversion system 2000 including embodiments of the thermal management system 1000 described with regard to FIGS. 1-3 is provided. The energy conversion system 2000 includes the fluid flow mechanism 1100, the first heat exchange circuit 1101, and the second heat exchange circuit 1102 such as described substantially in regard to the embodiments provided in FIGS. 1-3. In FIG. 4, the energy conversion system 2000 includes the thermal management system 1000 as a part of a turbomachine for a bottoming Rankine cycle.

In a particular embodiment, the energy conversion system 2000 may include at the first heat exchange circuit 1101 a recuperator or heat addition system 2100. The heat addition system 2100 may form a particular embodiment of the first heat exchanger 1140 described in regard to FIGS. 1-3. In various embodiments, the recuperator 2100 is a waste heat recovery system, such as positioned at an exhaust of a combustion system, a turbine system, or a closed cycle engine system. The recuperator 2100 is configured to provide heat or thermal energy to the heat transfer fluid at the first heat exchange circuit 1101. The fluid flow mechanism 1100 includes a third flow device 1123 operably coupled to the driveshaft 1113. A first portion 1101a of the first heat exchange circuit 1101 extends from the first flow device 1121 in thermal communication with the recuperator 2100 then to the third flow device 1123.

In a particular embodiment, the third flow device 1123 is a turbine or expander configured to allow the flow of heat transfer fluid to expand through a second portion 1101b of the first heat exchange circuit 1101. One or more additional first heat exchangers 1140, such as a fluid heater 2200, is positioned in thermal communication with the second portion 1101b of the first heat exchange circuit 1101 downstream of the third flow device 1123 along the second portion 1101b of the first heat exchange circuit 1101. The fluid heater 2200 is configured to receive heat or thermal energy from the heat transfer fluid at the second portion 1101b of the first heat exchange circuit 1101.

The energy conversion system 2000 further includes a third heat exchange circuit 1103. The third heat exchange circuit 1103 includes a first portion 1103a extended from the downstream or pressure side of the third flow device 1123 to provide the flow of heat transfer fluid to the second heat exchange circuit 1102 upstream of the second heat exchanger 1150. The third heat exchange circuit 1103 further includes a second portion 1103b extended from the second flow device 1122 to the third flow device 1123 and the conduit 1115 at the electric machine 1110.

In FIG. 4 the second flow device 1122 is positioned along the driveshaft 1113 between the first flow device 1121 and the third flow device 1123. The electric machine 1110 is positioned between the first flow device 1121 and the second flow device 1122. In FIGS. 2-3, the second flow device 1122 is positioned between the first flow device 1121 and the electric machine 1110. It should be appreciated that the second flow device 1122 may be positioned such as depicted in FIGS. 2-4. Furthermore, it should be appreciated that the first flow device 1121 and the third flow device 1123 may be re-arranged, such as may be suitable based on the configuration of the electric machine 1110 and heat exchangers. Various embodiments depicted and described herein include positions and flow arrangements of the heat exchange circuits such as to provide one or more improvement described herein.

The energy conversion system 2000 depicted in FIG. 4 may include a hermetically sealed turbomachine formed by the fluid flow mechanism 1100 for a bottoming Rankine Cycle. The system 2000 is cooled with an internal and substantially independently temperature controlled second heat exchange circuit 1102 charged by the first heat exchange circuit 1101. The independent temperature control is allowed by the thermal isolation of the first heat exchange circuit 1101 and the second heat exchange circuit 1102, such as described above. The internal second heat exchange circuit 1102 is pumped with a hermetically sealed fluid flow mechanism 1100 such as described herein. As such, the first, second, and third heat exchange circuits 1101, 1102, 1103 may be joined with the housing 1130 of the fluid flow mechanism to hermetically seal the heat transfer fluid therewithin. The driveshaft 1113 drives the flow devices 1121, 1122, 1123 to provide motive flow for cooling the electric machine 1110. Furthermore, the driveshaft 1113 drives the flow devices 1121, 1122, 1123 to provide motive flow for cooling the third flow device 1123 forming a power turbine. The second portion 1101b of the first heat exchange circuit 1101 may further include the fluid heater 2200 configured as a cooling heat exchanger (e.g., the thermal load heat exchanger 1142). The fluid heater 2200 receives heat or thermal energy from the heat transfer fluid at the second portion 1101b of the first heat exchange circuit to heat an oxidizer, such as air or oxygen (O2), a liquid and/or gaseous fuel (e.g., a kerosene-based fuel, diesel fuel, natural gas, a hydrocarbon fuel generally, or other appropriate fuel, or combinations thereof), a lubricant (e.g., oil or oil-based lubricant, a synthetic lubricant, etc.), a hydraulic fluid, a refrigerant, or other desired fluid.

It should be appreciated that the heat transfer fluid provided herein may be supercritical fluid (SCF) generally, such as any desired fluid within the system 1000 at a temperature and pressure above its critical point. In a particular embodiment, the heat transfer fluid is supercritical carbon dioxide. In other embodiments, the heat transfer fluid is an SCF that is water, methane, ethane, propane, ethylene, propylene, methanol, ethanol, acetone, or nitrous oxide, or other appropriate fluid, or combinations thereof. In still other embodiments, the heat transfer fluid is any appropriate fluid for receiving and transferring heat or thermal energy within the system 1000 such as described herein.

Referring now to FIG. 5, an exemplary embodiment of a vehicle 100 including a propulsion system 10 and the thermal management system 1000 according to aspects of the present disclosure is provided. In an embodiment, the vehicle 100 is an aircraft including an aircraft structure or airframe 105. The airframe 105 includes a fuselage 110 to which wings 120 and an empennage 130 are attached. The propulsion system 10 is attached to one or more portions of the airframe 105. In various embodiments, the thermal management system 1000 is a system configured to desirably distribute thermal loads, such as to add or remove heat from one or more fluids or structures, such as, but not limited to, oxidizer at the propulsion system, fuel, lubricant, hydraulic fluid, pneumatic fluid, or cooling fluid for an electric machine, electronics, computing system, environmental control system, gear assembly, or other system or structure.

In certain instances, the propulsion system 10 is attached to an aft portion of the fuselage 110. In certain other instances, the propulsion system 10 is attached underneath, above, or through the wing 120 and/or portion of the empennage 130. In various embodiments, the propulsion system 10 is attached to the airframe 105 via a pylon or other mounting structure. In still other embodiments, the propulsion system 10 is housed within the airframe, such as may be exemplified in certain supersonic military or commercial aircraft.

Various embodiments of the vehicle 100 include a computing system 140, such as avionics or other electronics or computing devices configured to control the vehicle 100 or the propulsion system 10. The vehicle 100 may further include an environmental control system (ECS) 150, such as to provide thermally conditioned air to a cabin of the vehicle, the computing system 140, a vehicle surface or propulsion system anti-icing system 160, or other system of the vehicle 100 or propulsion system 10. In various embodiments such as described herein, the computing system 140 controls the electric machine or one or more heat exchangers of the thermal management system 1000 or energy conversion system 2000 to adjust one or more flow rates, pressures, heat transfer rates, temperatures, or other actuatable properties to provide thermally conditioned heat transfer fluid to one or more of the systems described herein.

In certain embodiments, one or more of the first heat exchangers 1140 positioned in thermal communication along the first heat exchange circuit 1101 include a cooling system for the computing system 140, a heating system for the anti-icing system 160, a cooling or heating system for the ECS 150, or one or more heat exchangers for a liquid and/or gaseous fuel, compressor bleed air, lubricant system, bearing system, electric machine, or other system. The thermal load heat exchanger 1142 may include a cooled-cooling air system, such as a heat removal system for removing heat from compressor bleed air from the propulsion system. The thermal load heat exchangers 1142 may include engine controls (e.g., FADEC, digital engine controls, propeller controls, or other computing devices), electric machines, motor/generators, starters, batteries, alternators, capacitors, or other heat loads generated by the propulsion system. The thermal load heat exchangers 1142 may include avionics, ECS, or other heat loads generated by the vehicle 100.

One or more components of the propulsion system 10 and thermal management system 1000 described herein may be manufactured or formed using any suitable process, such as an additive manufacturing process, such as a 3-D printing process. The use of such a process may allow such components to be formed integrally, as a single monolithic component, or as any suitable number of sub-components, or at scales and intricacies not previously allowed or conceived in the art. In particular, the additive manufacturing process may allow such component to be integrally formed and include a variety of features not possible when using prior manufacturing methods. For example, the additive manufacturing methods described herein may allow for the manufacture of the fluid flow mechanism as a single, integral component having the conduits and circuits as provided herein. In further embodiments, the additive manufacturing methods described herein allow for the manufacture of the system 1000 having the fluid flow mechanism, the circuits, conduits, and housing hermetically sealing the heat transfer fluid such as described herein. Additionally, additive manufacturing allows for having unique features, configurations, thicknesses, materials, densities, fluid circuits and conduits, headers, seals, and other structures that may not have been possible or practical using prior manufacturing methods.

Suitable additive manufacturing techniques in accordance with the present disclosure include, for example, Fused Deposition Modeling (FDM), Selective Laser Sintering (SLS), 3D printing such as by inkjets, laser jets, and binder jets, Stereolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes. Suitable powder materials for the manufacture of the structures provided herein as integral, unitary, structures, or at scales and intricacies provided herein, include metallic alloy, polymer, or ceramic powders. Exemplary metallic powder materials are stainless steel alloys, cobalt-chrome, aluminum alloys, titanium alloys, nickel based superalloys, and cobalt based superalloys. In addition, suitable alloys may include those that have been engineered to have good oxidation resistance, known as "superalloys" which have acceptable strength at the elevated temperatures of operation in a gas turbine engine, e.g. Hastelloy, Inconel alloys (e.g., IN 738, IN 792, IN 939), Rene alloys (e.g., Rene N4, Rene N5, Rene 80, Rene 142, Rene 195), Haynes alloys, Mar M, CM 247, CM 247 LC, C263, 718, X-850, ECY 768, 282, X45, PWA 1483 and CMSX (e.g. CMSX-4) single crystal alloys. The manufactured objects of the present disclosure may be formed with one or more selected crystalline microstructures, such as directionally solidified ("DS") or single-crystal ("SX").

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

1. A thermal management system, the system comprising a fluid flow mechanism comprising an electric machine, wherein a conduit is formed through the electric machine allowing a heat transfer fluid to flow therethrough, wherein the fluid flow mechanism comprises a flow device configured to provide a first portion of the heat transfer fluid to a first heat exchange circuit and a second portion of heat transfer fluid to a second heat exchange circuit, wherein the conduit is in fluid communication with the second heat exchange circuit.

2. The system of any one or more clauses herein, wherein the second heat exchange circuit is at least partially in parallel flow arrangement with the first heat exchange circuit.

3. The system of any one or more clauses herein, wherein the fluid flow mechanism comprises a driveshaft operably coupled to the electric machine and the flow device.

4. The system of any one or more clauses herein, wherein the fluid flow mechanism comprises a housing, and wherein the housing, the electric machine, the first heat exchange circuit, and the second heat exchange circuit hermetically seal the heat transfer fluid therewithin.

5. The system of any one or more clauses herein, wherein the flow device comprises a first flow device configured to provide the first portion of the heat transfer fluid to the first heat exchange circuit, and wherein the flow device comprises a second flow device configured to provide the second portion of the heat transfer fluid to the second heat exchange circuit.

6. The system of any one or more clauses herein, wherein the fluid flow mechanism comprises a driveshaft operably coupled to the electric machine, the first flow device, and the second flow device.

7. The system of any one or more clauses herein, the fluid flow mechanism comprising a housing surrounding the driveshaft, the first flow device, and the second flow device, and wherein a seal is operably coupled to the driveshaft between the first flow device and the second flow device.

8. The system of any one or more clauses herein, wherein the seal separates the second heat exchange circuit and the first heat exchange circuit into substantially separate, parallel flows.

9. The system of any one or more clauses herein, wherein the flow device is an impeller.

10. The system of any one or more clauses herein, the system comprising a first heat exchanger positioned in thermal communication at the first heat exchange circuit.

11. The system of any one or more clauses herein, wherein a plurality of the first heat exchanger is positioned in thermal communication at the first heat exchange circuit.

12. The system of any one or more clauses herein, wherein the plurality of the first heat exchanger comprise a thermal bus heat exchanger and a thermal load heat exchanger each in thermal communication with the heat transfer fluid at the first heat exchange circuit.

13. The system of any one or more clauses herein, the system comprising a second heat exchanger positioned in thermal communication at the second heat exchange circuit.

14. The system of any one or more clauses herein, wherein the second heat exchanger is an electric machine-cooler heat exchanger positioned upstream of the conduit at the second heat exchange circuit.

15. A vehicle, the vehicle comprising a thermal management system, the system comprising a fluid flow mechanism, wherein the fluid flow mechanism comprises an electric machine, wherein a conduit is formed through the electric machine allowing a heat transfer fluid to flow therethrough, wherein the fluid flow mechanism comprises a flow device configured to provide a first portion of the heat transfer fluid to a first heat exchange circuit and a second portion of heat transfer fluid to a second heat exchange circuit, wherein the conduit is in fluid communication with the second heat exchange circuit; a thermal load heat exchanger positioned in thermal communication with the heat transfer fluid at the first heat exchange circuit, wherein the thermal load heat exchanger is configured to provide heat to the heat transfer fluid at the first heat exchange circuit; a thermal bus heat exchanger positioned in thermal communication with the heat transfer fluid at the first heat exchange circuit, wherein the thermal bus heat exchanger is configured to receive heat from the heat transfer fluid at the first heat exchange circuit; and an electric machine-cooler heat exchanger positioned in thermal communication with the heat transfer fluid at the second heat exchange circuit, wherein the electric machine-cooler heat exchanger is configured to receive heat from the heat transfer fluid at the second heat exchange circuit.

16. The vehicle of any one or more clauses herein, wherein the second heat exchange circuit is at least partially in parallel flow arrangement with the first heat exchange circuit.

17. The vehicle of any one or more clauses herein, wherein the flow device comprises a first flow device configured to provide the first portion of the heat transfer fluid to the second heat exchange circuit, and wherein the flow device comprises a second flow device configured to provide the second portion of the heat transfer fluid to the first heat exchange circuit.

18. The vehicle of any one or more clauses herein, wherein the thermal bus heat exchanger is positioned upstream of the thermal load heat exchanger along the first heat exchange circuit.

19. The vehicle of any one or more clauses herein, the thermal management system comprising a charging port fluidly connecting the first heat exchange circuit upstream of the thermal bus heat exchanger and downstream of the flow device to a first portion of the second heat exchange circuit upstream of the electric machine-cooler heat exchanger.

20. The vehicle of any one or more clauses herein, wherein the thermal load heat exchanger is one or more of a computing system, an anti-icing system, an electric machine, an environmental control system, or a propulsion system thermal load.

What is claimed is:

1. A thermal management system, the system comprising:
a fluid flow mechanism comprising an electric machine, wherein a conduit is formed through the electric machine allowing a heat transfer fluid to flow therethrough, wherein the fluid flow mechanism comprises a flow device configured to provide a first portion of the heat transfer fluid to a first heat exchange circuit and a second portion of heat transfer fluid to a second heat exchange circuit, wherein the conduit is in fluid communication with the second heat exchange circuit; and
a second heat exchanger positioned in thermal communication at the second heat exchange circuit, wherein the second heat exchanger is an electric machine-cooler heat exchanger positioned upstream of the conduit at the second heat exchange circuit.

2. The system of claim 1, wherein the second heat exchange circuit is at least partially in parallel flow arrangement with the first heat exchange circuit.

3. The system of claim 1, wherein the fluid flow mechanism comprises a driveshaft operably coupled to the electric machine and the flow device.

4. The system of claim 3, wherein the fluid flow mechanism comprises a housing, and wherein the housing, the electric machine, the first heat exchange circuit, and the second heat exchange circuit hermetically seal the heat transfer fluid therewithin.

5. The system of claim 1, wherein the flow device comprises a first flow device configured to provide the first portion of the heat transfer fluid to the first heat exchange circuit, and wherein the flow device comprises a second flow device configured to provide the second portion of the heat transfer fluid to the second heat exchange circuit.

6. The system of claim 5, wherein the fluid flow mechanism comprises a driveshaft operably coupled to the electric machine, the first flow device, and the second flow device.

7. The system of claim 6, the fluid flow mechanism comprising a housing surrounding the driveshaft, the first flow device, and the second flow device, and wherein a seal is operably coupled to the driveshaft between the first flow device and the second flow device.

8. The system of claim 7, wherein the seal separates the second heat exchange circuit and the first heat exchange circuit into substantially separate, parallel flows.

9. The system of claim 1, wherein the flow device is an impeller.

10. The system of claim 1, the system comprising:
a first heat exchanger positioned in thermal communication at the first heat exchange circuit.

11. The system of claim 10, wherein the first heat exchanger comprises a plurality of first heat exchangers positioned in thermal communication with the heat transfer fluid through the first heat exchange circuit.

12. The system of claim 10, wherein the plurality of first heat exchangers comprises a thermal bus heat exchanger and a thermal load heat exchanger each in thermal communication with the heat transfer fluid through the first heat exchange circuit.

13. A vehicle, the vehicle comprising:
a thermal management system, the system comprising a fluid flow mechanism, wherein the fluid flow mechanism comprises an electric machine, wherein a conduit is formed through the electric machine allowing a heat transfer fluid to flow therethrough, wherein the fluid flow mechanism comprises a flow device configured to provide a first portion of the heat transfer fluid to a first heat exchange circuit and a second portion of heat transfer fluid to a second heat exchange circuit, wherein the conduit is in fluid communication with the second heat exchange circuit;
a thermal load heat exchanger positioned in thermal communication with the heat transfer fluid at the first heat exchange circuit, wherein the thermal load heat exchanger is configured to provide heat to the heat transfer fluid at the first heat exchange circuit;
a thermal bus heat exchanger positioned in thermal communication with the heat transfer fluid at the first heat exchange circuit, wherein the thermal bus heat exchanger is configured to receive heat from the heat transfer fluid at the first heat exchange circuit; and
an electric machine-cooler heat exchanger positioned in thermal communication with the heat transfer fluid at the second heat exchange circuit, wherein the electric machine-cooler heat exchanger is configured to receive heat from the heat transfer fluid at the second heat exchange circuit.

14. The vehicle of claim 13, wherein the second heat exchange circuit is at least partially in parallel flow arrangement with the first heat exchange circuit.

15. The vehicle of claim 13, wherein the flow device comprises a first flow device configured to provide the first portion of the heat transfer fluid to the second heat exchange circuit, and wherein the flow device comprises a second flow device configured to provide the second portion of the heat transfer fluid to the first heat exchange circuit.

16. The vehicle of claim 13, wherein the thermal bus heat exchanger is positioned downstream of the thermal load heat exchanger along the first heat exchange circuit.

17. The vehicle of claim 13, the thermal management system comprising a charging port fluidly connecting the first heat exchange circuit upstream of the thermal bus heat exchanger and downstream of the flow device to a first portion of the second heat exchange circuit upstream of the electric machine-cooler heat exchanger.

18. The vehicle of claim 13, wherein the thermal load heat exchanger is one or more of a computing system, an anti-icing system, an electric machine, an environmental control system, or a propulsion system thermal load heat exchanger.

* * * * *